July 18, 1933.    M. BUCHNER    1,918,377
APPARATUS FOR THE DECOMPOSITION OF COMPLEX HYDROFLUORIC SALTS
Original Filed July 26, 1927
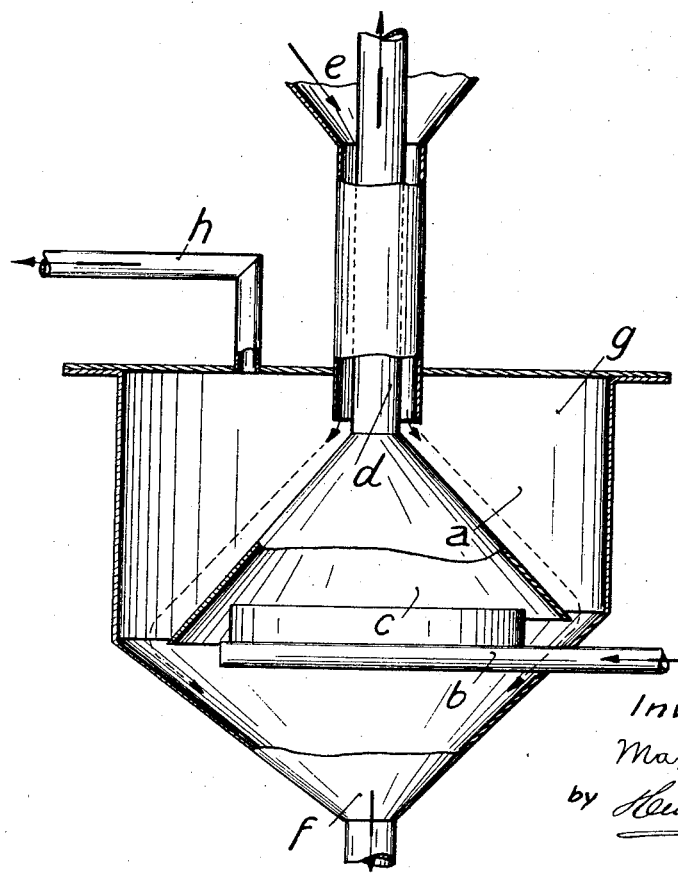
Inventor:
Max Buchner
by Henry Orth Jr.
Atty.

Patented July 18, 1933

1,918,377

UNITED STATES PATENT OFFICE

MAX BUCHNER, OF HANOVER-KLEEFELD, GERMANY

APPARATUS FOR THE DECOMPOSITION OF COMPLEX HYDROFLUORIC SALTS

Original application filed July 26, 1927, Serial No. 208,607, and in Germany July 27, 1926. Divided and this application filed February 12, 1930. Serial No. 427,965.

This invention relates to apparatus suited for the decomposition of complex hydrofluoric salts by thermic treatment, and is a division of my application #208,607, filed July 26, 1927.

The decomposition of complex hydrofluoric salts, such as sodium silicofluoride, potassium silicofluoride, barium silicofluoride and the like by heating has heretofore presented insurmountable difficulties, as it was not possible, to, for instance, completely convert sodium silicofluoride into silicon fluoride and sodium fluoride. By the invention it becomes possible to attain this aim. In the apparatus which will be hereinafter described and are diagrammatically shown by way of example in the accompanying drawing, a practically perfect decomposition is obtained.

The characteristic feature of the new apparatus is a separate reaction space, in which the material to be decomposed is continually spread in thin layers during the decomposition. The reaction space or the surface on which the material to be decomposed is charged being in movement and the heat necessary for the decomposition being supplied directly or by radiation.

The new apparatus is shown by way of example in the figure.

$a$ is a conical rotary body which is heated from below either directly by means of a gas supply $h$ or indirectly by means of radiating bricks $c$. The discharging of the gases from combustion is effected through pipe $d$ from the conical body so that these gases do not come into touch with the material to be decomposed.

The material is supplied at $e$, drops around the chimney in being preliminarily heated and distributes itself over the cone along the dash lines and according to the direction of the arrow. The angle of inclination and the revolving speed of the cone have to be regulated so that the material to be decomposed, i. e. sodium silicofluoride, when moving along the cone, is completely decomposed.

The solid portion of the material drops around the cone into the discharge funnel $f$. The housing $g$ enclosing the cone holds together the gaseous components which are discharged through the pipe $h$.

At suitable points admission openings for a diluting gas may be arranged, so that the discharging of the volatile fluoride is facilitated.

The space above the conical body, as shown in the drawing, for which however a plane plate may be substituted, might be of shaft shape. In any case it is advisable to conduct the material to be heated onto the center of the rotary body.

Instead of heating by gas or by radiating bricks as indicated in the figure, heating by electric heating bodies or by radiating heat from above upon to the material to be decomposed may be applied.

I claim:

1. Apparatus for the decomposition of complex hydrofluoric salts, comprising a rotary cone, a charging device for supplying the material to above the center of said rotary cone, heating devices below said rotary cone, a housing enclosing said rotary cone and said heating devices, a discharge on the lower portion of said housing for the discharge of the solid product from decomposition, and a discharge on the upper portion of said housing for discharging the gaseous product from decomposition.

2. Apparatus for the decomposition of complex hydrofluoric salts, comprising a rotary cone, a charging device for supplying the material to above the center of said rotary cone, heating devices above said rotary cone, adapted to transmit heat to the material by radiation, a housing enclosing said rotary cone and said heating devices, a discharge on the lower portion of said housing for the discharge of the solid product from decomposition, and a discharge on the upper portion of said housing for discharging the gaseous product from decomposition.

3. Apparatus for the decomposition of complex hydrofluoric salts, comprising a reaction chamber provided with a rotary plate, means for spreading the material to be decomposed continually in thin layers on the plate and means for heating the material indirectly.

4. Apparatus for the decomposition of complex hydrofluoric salts, comprising a reaction chamber provided with a plate, rotary means for spreading the material to be decomposed continually in thin layers on the plate and means for heating the material indirectly.

5. Apparatus for the decomposition of complex hydrofluoric salts, comprising a reaction chamber provided with a rotary plate, means for spreading the material to be decomposed continually in thin layers on the plate and means for heating the material by radiation.

6. Apparatus for the decomposition of complex hydrofluoric salts, comprising a reaction chamber provided with a plate, rotary means for spreading the material to be decomposed continually in thin layers on the plate and means for heating the material by radiation.

MAX BUCHNER.